Jan. 29, 1963   G. G. ENSIGN ET AL   3,075,345
ELECTRICALLY-POWERED TIME DEVICES
Original Filed April 15, 1952   6 Sheets-Sheet 1
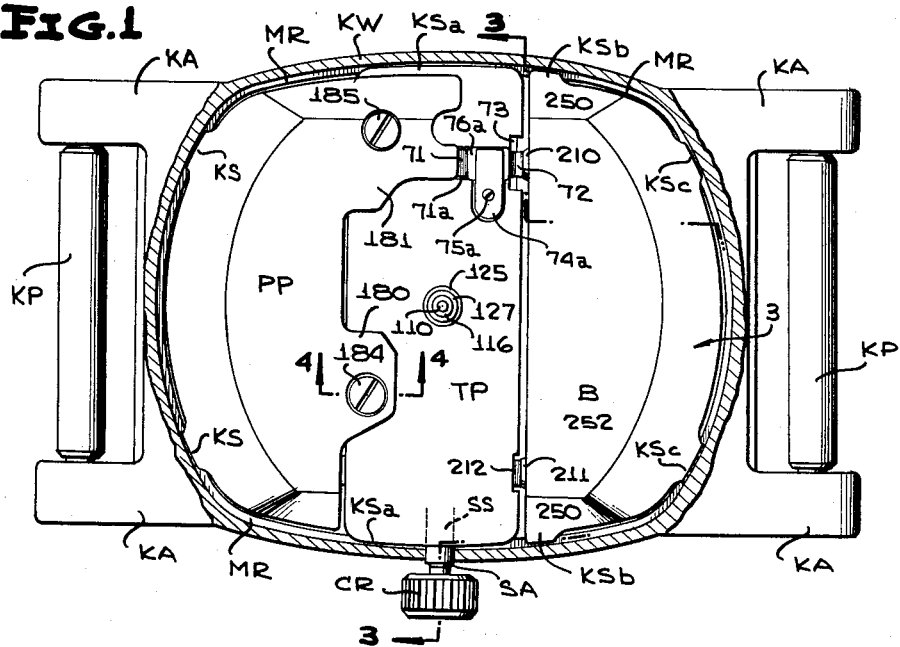
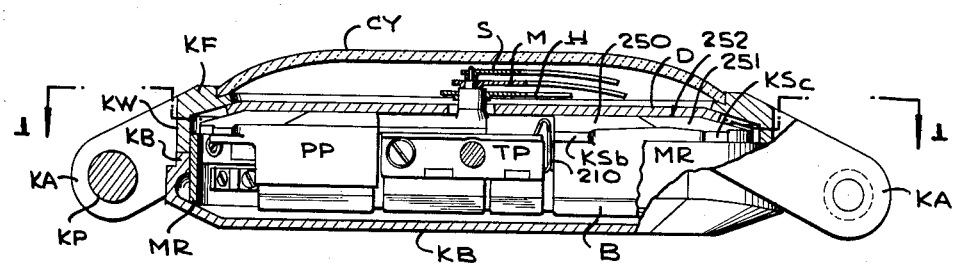
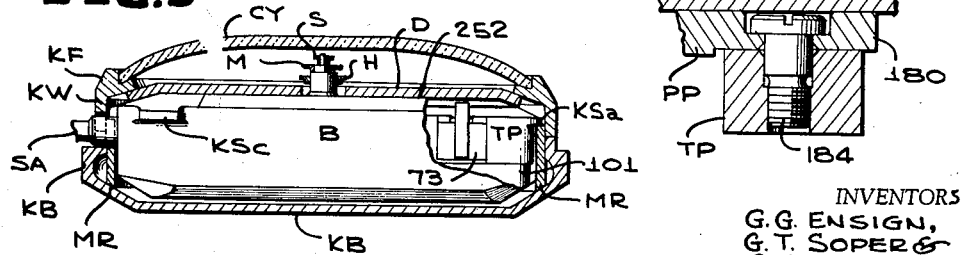
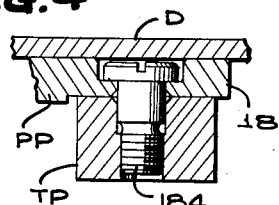
INVENTORS
G. G. ENSIGN,
G. T. SOPER &
O. LUNDAHL
BY *Mason, Porter, Diller & Stewart,*
ATTORNEYS

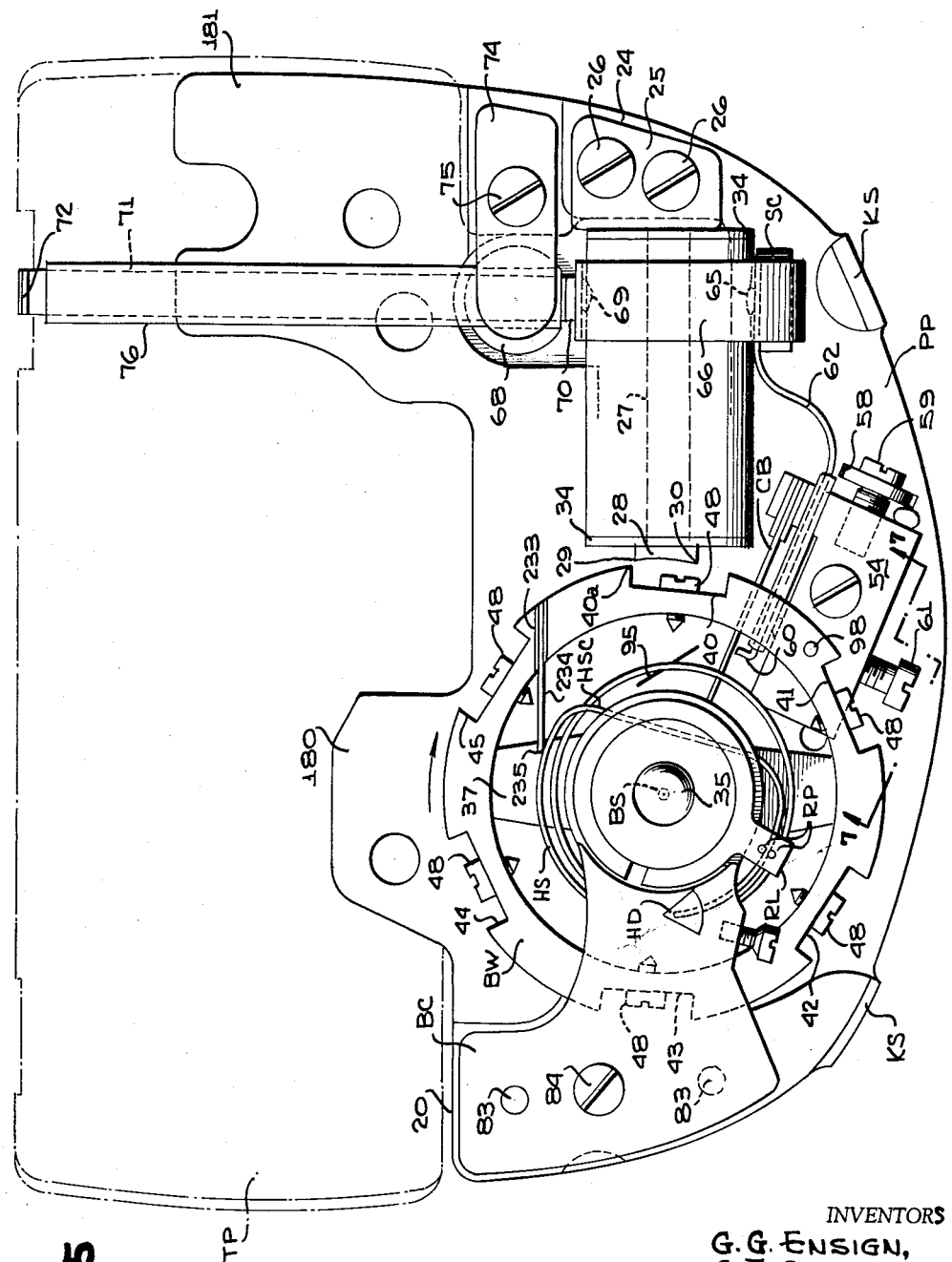

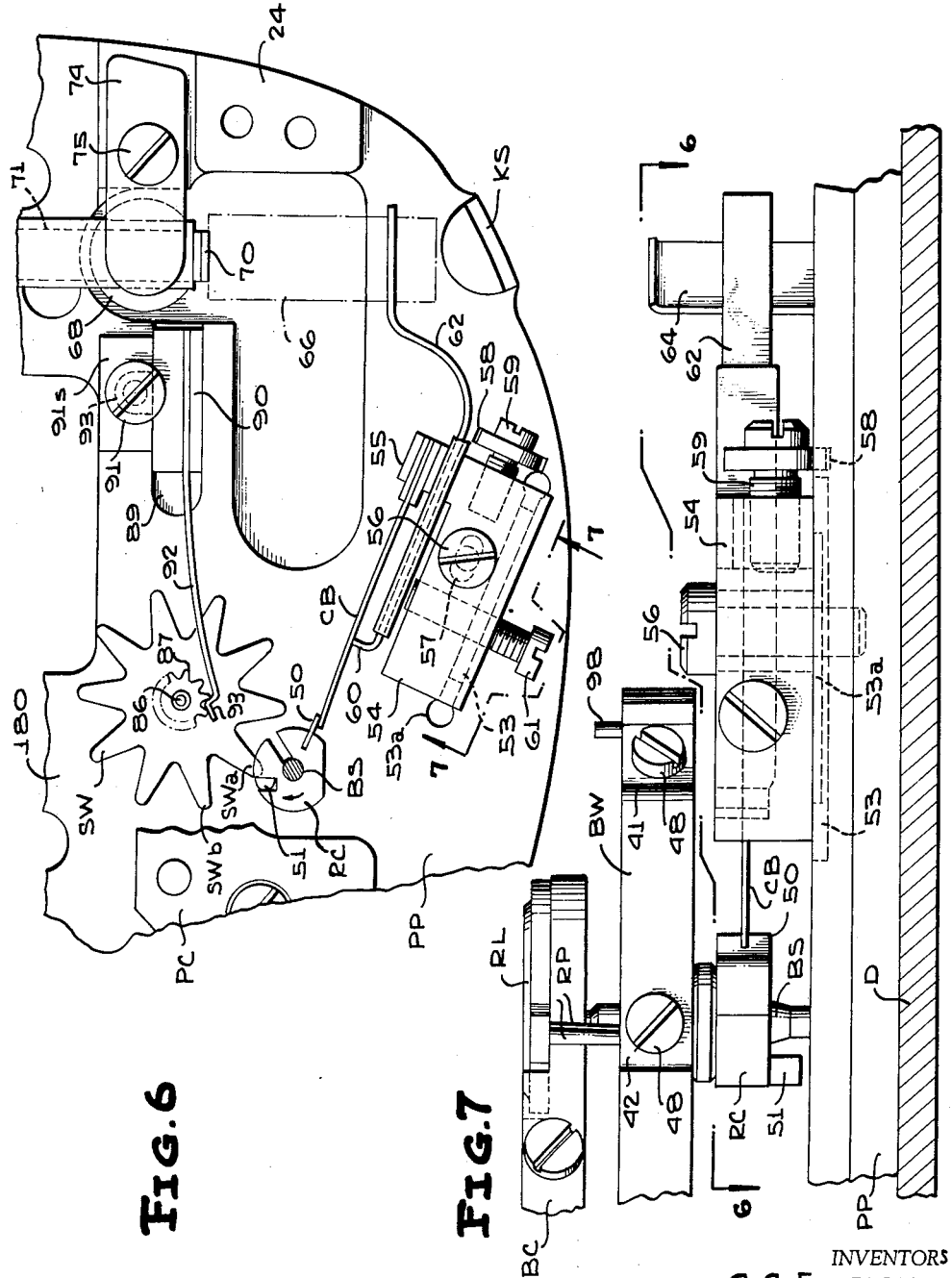

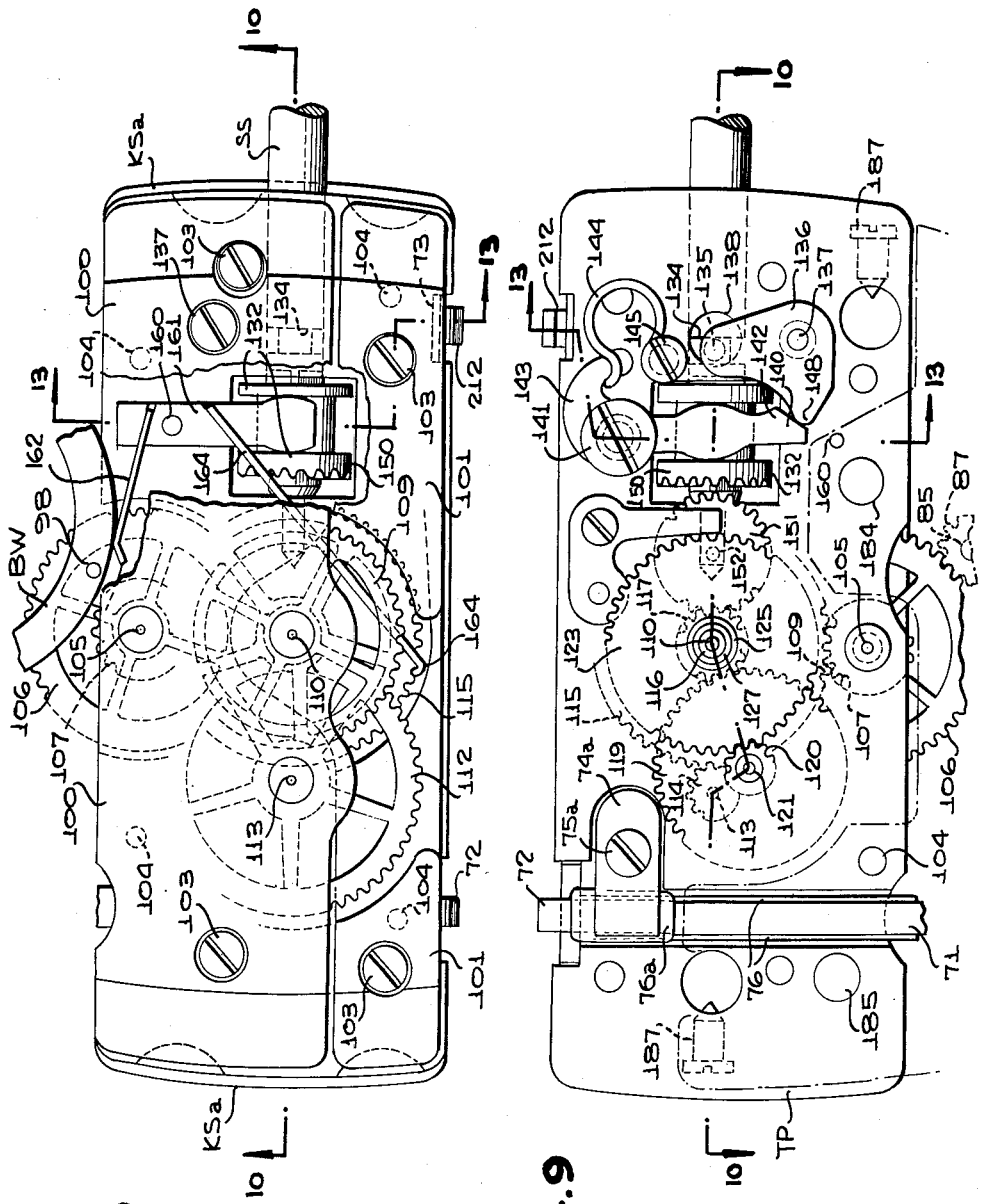

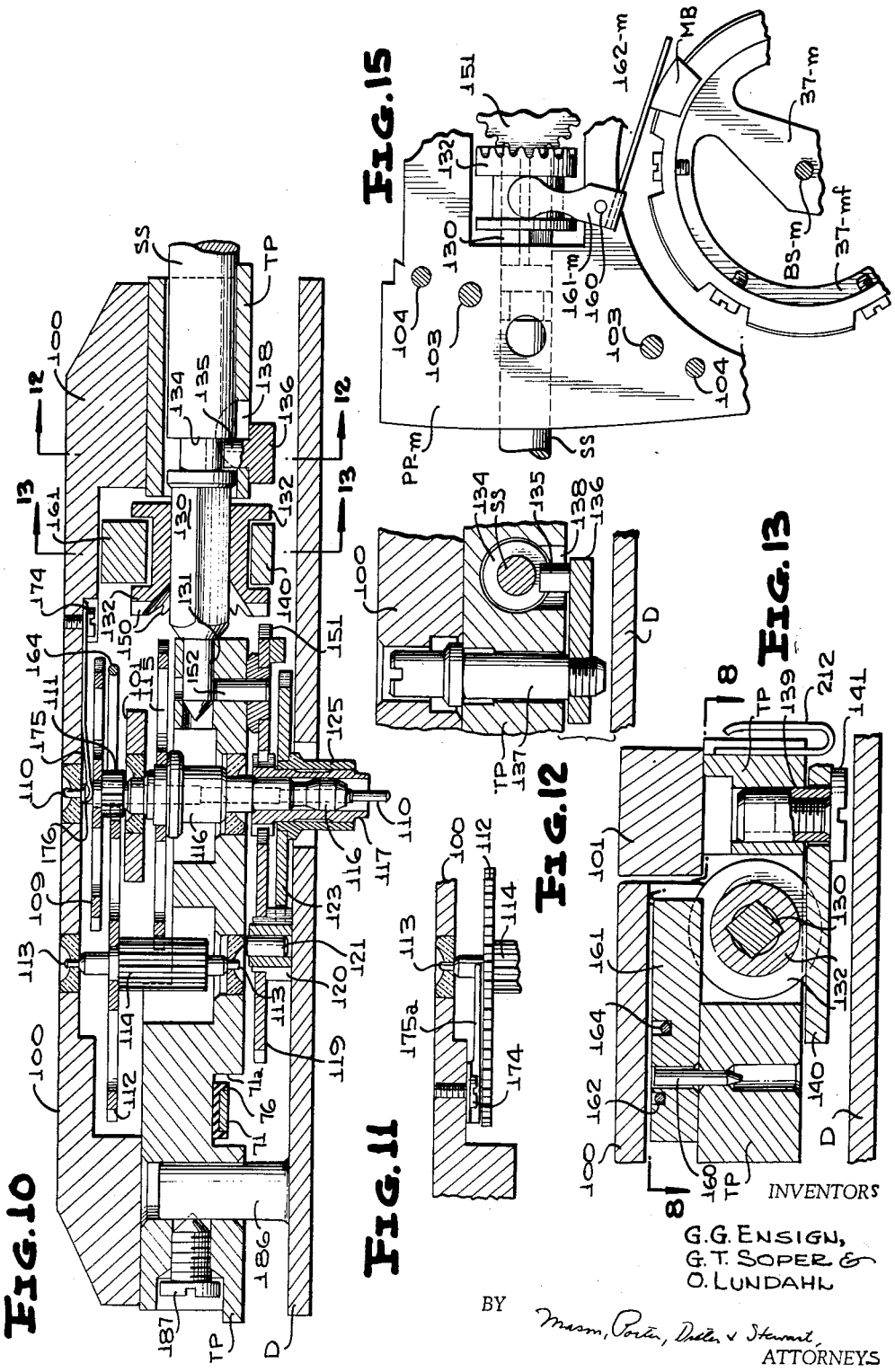

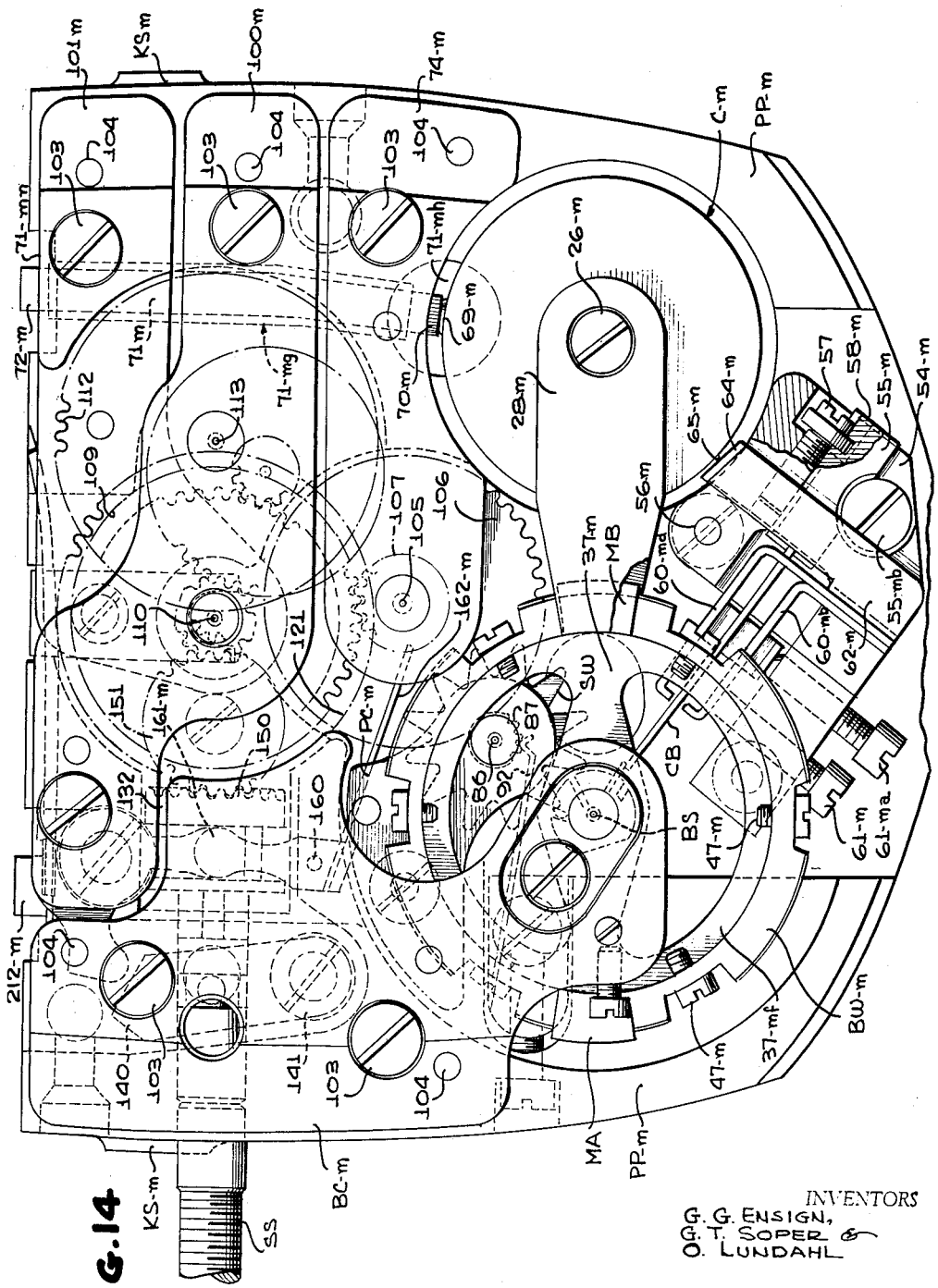

United States Patent Office 3,075,345
Patented Jan. 29, 1963

3,075,345
ELECTRICALLY-POWERED TIME DEVICES
George G. Ensign, Glenn T. Soper, and Ossian Lundahl, Elgin, Ill., assignors to Elgin National Watch Company, Elgin, Ill., a corporation of Illinois
Original application Apr. 15, 1952, Ser. No. 282,388, now Patent No. 2,865,163, dated Dec. 23, 1958. Divided and this application Dec. 22, 1958, Ser. No. 788,701
6 Claims. (Cl. 58—28)

This invention relates to electrically actuated time measuring devices, and is particularly concerned with such devices preferably of a self-contained nature and which can operate over long periods without replacement or adjustment of parts.

This application is a division of our copending application Ser. No. 282,388, filed April 15, 1952, now United States Letters Patent 2,865,163; and is concerned with a stop element and a structure whereby the time measuring device may be completely assembled and cased, with a battery, and an externally accessible circuit breaker system is present to prevent employment of the battery prior to use of the watch.

Many previous proposals and structures have been made in which an electrical battery serves to maintain a balance or like system in oscillation and to operate a time-indicating train. Some commercial structures have been devised for conditions where no limitations of sizes or power requirements are present, for example clocks; while others have had minor restrictions on one or more of the size dimensions, for example automobile clocks, wherewith the current is supplied from the automobile battery and may amount to even several watts; and yet others have been made to operate from a single standard flashlight cell, with the minor restriction of providing space for such a cell and of having mechanical parts which do not so rapidly drain the cell that the timepiece requires cell replacement frequently. As a general rule, the commercially available devices have required electrical power of the order of a milliwatt as a minimum.

When it is sought to provide a wrist watch, the size and weight restrictions for commercial acceptance, with portability and lack of encumbrance equal to that of a spring-driven wrist watch, demand a contained battery and a motive device actuated therefrom which will operate over a period of a year or more, i.e., corresponding to the idle shelf life of many commercial batteries.

A feature of the invention is the provision of an electrically powered watch as described above having an externally accessible means for setting and resetting the position of the hands or other time indicator and concurrently preventing deleterious effects while parts are in a setting position.

A further feature is the provision of an electrically powered watch as described above having an externally accessible means for locking the power train to facilitate the setting operation.

A further feature is the provision of an electrically powered watch as described above having an externally accessible means for stopping the motor mechanism to facilitate the setting operation.

A further feature is the provision of an electrically powered watch as described above having an externally accessible means for opening a portion of the electric circuit to prevent wastage of energy while the watch is not being used.

With these and other features as objects in view, as will appear in the course of the following description and claims, illustrative practices in accordance with this invention are shown in the accompanying drawings, in which:

FIG. 1 is a plan of one form of movement, with the dial removed and the case in section on line 1—1 of FIG. 2.

FIG. 2 is a longitudinal section through the watch case and dial, with the movement plates and battery shown in elevation.

FIG. 3 is a cross-section through the watch case, substantially on broken line 3—3—3 of FIG. 1, with the electrical battery shown partly in elevation and partly broken away.

FIG. 4 is a detail in enlarged cross-section, substantially on line 4—4 of FIG. 1 showing the assembly of power and train sub-assemblies.

FIG. 5 is a plan view of the motor unit, seen from the balance cock side, and on a scale larger than that of FIGS. 1–3, with star wheel and certain parts below the balance wheel omitted for clearness.

FIG. 6 is a sectional view substantially on broken lines 6—6 of FIG. 7.

FIG. 7 is a sectional view showing contact parts, substantially on lines 7—7 of FIGS. 5 and 6.

FIG. 8 is a plan view of the train sub-assembly of FIGS. 1–4, from the side opposite the dial, partly broken away to show balance-stopping structures.

FIG. 9 is a plan view of the train sub-assembly, from the dial side, the dial being removed.

FIG. 10 is a longitudinal section through the train sub-assembly substantially on broken lines 10—10 of FIGS. 8 and 9.

FIG. 11 is a fragment, corresponding to FIG. 10, showing another form of back-lash control.

FIG. 12 is a sectional view of parts of the setting mechanism, substantially on lines 12—12 of FIG. 10.

FIG. 13 is a section substantially on broken lines 13—13 of FIGS. 8, 9 and 10, showing parts of the balance-stopping system.

FIG. 14 is a view corresponding to FIG. 5, showing a further form of structure.

FIG. 15 is a fragmentary view of parts in FIG. 14, parallel to the base plate, showing the hack lever.

It will be understood that, for simplicity and clearness, certain structures and parts normal to conventional watches, such as details of plates, pinion and wheel assemblies, and jewel bearings, have been omitted from the drawings; and that the inclusion of such, if desired, is within the purview of constructional embodiments.

In the form of case and mounting illustrated in FIGS. 1 to 4, the watch case has a front ring KF integral with the wall KW which surrounds the movement structures and battery and has the attachment lugs KA for supporting the pin bars KP for receiving the watch strap. The front ring KF has the usual groove for the crystal CY. The rear of the case is closed by the case back KB which is frictionally fitted into a rebate provided at the rear of the case wall KW. The case wall KW is notched for the passage of the part SA of the setting stem SS having the crown CR.

Within the cavity provided by the case members are seated the dial D which bears against the inner face of the front ring KF; a motor and take-off sub-assembly including a power unit base plate PP; a train sub-assembly mounted on a train unit base plate TP; and an electric battery B, these parts being assembled in a mounting ring MR from the dial side thereof, and this assembly then inserted through the rear of the case, in the absence of the case back KB. In FIGS. 2 and 3, the structure is shown as having the sweep-seconds, minutes and hours hands S, M and H, mounted as usual between the dial D and the crystal CY. In the illustrated construction, the motor and train sub-assemblies are connected together as a unit, before introduction into the mounting ring MR, as described hereinafter.

The power base plate PP has case shoulders KS, and the train base plate TP has case shoulders KS*a*. The battery B has case shoulders KS*b* and KS*c*. These case shoulders are engaged by the mounting ring MR which is slipped inside of the case wall KW and, being itself held by the case back KB, serves to hold the parts, including the dial, tightly against the front ring KF.

The illustrated power unit base plate PP has two projections 180, 181 which overlap parts of the train unit base plate TP, so that the parts may be assembled in rigid relative position, prior to encasing, by the screws 184, 185. FIG. 4 shows the assembly at the projection 180, and that at the projection 181 is the same save for the relative size of parts. The terminals 210, 211 of the battery B are on a wall parallel to the staff axes, and cooperate with the contact clips 72, 212 carried on the plate TP.

The base plate PP of the motor sub-assembly is illustratively made of magnetizable material of low permanent magnetism, i.e. remanence. As shown in FIG. 5, the base plate PP has upwardly extending portions 20, 24. On the projection 24 is fixedly mounted a block 25 which is held in position by screws 26 passing through holes of block 25 which are larger than the screw stems. Block 25 supports a core piece 27 at whose free end is a stator block 28 providing a pole face between the peripherally spaced edges 29, 30 thereof. In the example of execution the pole face 28 has an arcuate angle, relative to the balance system axis, of 16 degrees. In the illustrated form, the block 25, core 27, and stator block 28 are formed integrally of magnetizable material of low permanent magnetism.

A coil C is wound on the core 27 between the end washers 34.

A balance cock BC is secured (FIG. 5) to the face of the projection 20 and carries the bearing 35 for one end of the balance staff BS.

The balance staff BS supports the diametrical crossarm 37 of the balance wheel having the rim BW made of magnetizable material of low permanent magnetism. This balance wheel rim BW has notches 40, 41, 42, 43, 44, 45; the notch 40 being shown adjacent the stator pole face 28, an illustrative position. The notches have the same peripheral dimension, which is greater in this form than the distance between the pole face edges 29, 30. The balance wheel notches receive the heads of the rating or poising screws 48 so that the heads thereof do not extend beyond the general rim periphery, whereby the mechanical clearance, i.e. the magnetic air gap, between the stator pole face 28 and the balance rim BW may be made very small. The notches 40 . . . 45 in the illustrative form each have an arcuate angle, relative to the balance system axis, of 24 degrees. The pole face 28 and notch 40 are so oriented, at the beginning of electrical impulse in the clockwise balance stroke, that the edge 29 is spaced about 2 arcuate degrees from the adjacent edge 40*a* of the notch 40.

The balance staff BS supports the hairspring collet HC to which is fixed the inner end of the spiral hairspring HS, which, at its outer end, is pinned in the hairspring stud HD. A regulator lever RL may be positioned on the balance cock BC and have the regulator pins RP for engaging the hairspring at positions of adjustment near the hairspring stud HD. The hairspring HS is shown as a spiral having a so-called over-coil HSC displaced out of the main plane of the spiral in the usual fashion.

The balance staff BS receives a collet RC (FIGS. 6 and 7) having a radially projecting fin 50 for actuating the electric contact system, and made of sapphire or like abrasion-resistant material. The collet RC also carries the axially projecting jewel pin or roller 51 for moving the power take-off star wheel SW and thence the timing train.

The base plate PP has a groove 53 (FIGS. 5, 6 and 7) along which may guidedly move the downwardly extending key 53*a* of a block 54 having a projection 55 supporting one end of the electrical contact blade CB. A screw 56 passing through the slot 57 of block 54 engages in the base plate PP for binding the block 54, 55 in its adjusted position. The movement of the block 54, 55 relatively toward and from the balance staff BS is produced by a screw 59 engaged in the block 54 and having an enlarged head engaged in a notch 58 in the base plate PP.

The projection 55 also has a notch in which is insulatedly mounted the fixed contact blade 60 having one end bent angularly for engagement by the movable contact blade CB. The relative position of this end can be adjusted by the screw 61 (FIGS. 5, 6, and 7) mounted in the block 54. The blade 60 is illustrated as formed integrally with an extension portion 62 which bears against the terminal 65 on the coil C.

The other terminal 69 of the coil C is engaged by a conductive yoke 66 which extends arcuately over the coil C to a point opposite the terminal 65 and mechanically engages and holds the rectifier SC against the extension 62 so that this rectifier is electrically in shunt to the coil C. It will be noted that the yoke 66 imposes no lateral displacing force upon the coil. A spring clip 70 is formed as an upstanding end of a conductor strip 71 which extends across the train base plate TP and has a spring contact end 72 for engaging one terminal of the battery B. A clamping block 74 is held to the base plate PP by a screw 75 and presses a piece of insulation 76 against the conductor strip 71, and this in turn against the insulating block 68 which preferably is cemented onto the base plate PP.

Except for the contact clip ends 70, 72 and the portion engaged with the rectifier SC, the conductor strip 71 is insulated electrically, from the train base plate TP, along a groove 71*a* in which (FIG. 10) it passes and to which it is clamped by block 74*a* and screw 75*a*. An insulating block 73 (FIG. 8) prevents contact of the end contact clip 72 with the train base plate TP if the battery is forced too far toward the train sub-assembly.

The star wheel pinion 87 has the pivots 86 and supports the star wheel SW, which in the illustrative form has ten teeth which successively come into the path of movement of the axially extending jewel pin 51 on the collet RC. In the illustrated form, the shapes and sizes of the teeth in pinion 87 and in the transfer wheel 106 meshing therewith provide a permissive back lash of 7 degrees in the pinion 87. A block 90 is mounted in a groove 89 (FIG. 6) on the base plate PP and is held fixed by a screw 91 passing through a hole 93 in an elevation 91*s* on the base plate PP, so that its head binds the block 90, and supports a locating spring 92 having a bent free end, with a bight 93 positioned for engagement in the gaps between adjacent teeth of the pinion 87, and effective for acting against these teeth for positioning the successive star wheel points in a predetermined angular position relative to the line between the axes of staff BS and pinion 87, while the star wheel is momentarily at rest. By loosening the screw 91, and moving the block 90 along the groove 89, the position of the end of the locating spring 92 may be shifted, and therewith the angular positions occupied by the pinion 87 and the star wheel SW while at rest, thus controlling the position of the star wheel points, illustratively SW*a*, at the instants of engagement by the jewel pin 51. A witness mark 95 is placed on the base plate PP at a point visible past the balance cock BC, and past balance parts, for a final accurate adjustment of the proper position of the star wheel points while at rest.

The balance wheel rim BW has a pin 98 for engagement by a balance stopping structure as described hereinafter. The balance rim BW has a chordal notch 233 in which is fixed a spring wire 234 that projects chordally inward (FIG. 5) and has a down-turned inner end 235 for engagement with the outer hairspring turn for limiting expansion of the hairspring.

The balance system oscillates in the usual fashion. It receives an impulse magnetically at each cycle of oscillation. Therewith, the roller collet RC moves its jewel pin 51 in a path which intersects the points of the star wheel SW, and thus the train is driven as shown in FIGS. 3, 10 and 11.

In FIG. 6, the parts are shown at neutral axis, that is, in the position at the start of the indexing movement of the star wheel SW, the balance system being assumed in its clockwise stroke as indicated by the arrow. At the start of the indexing movement, the jewel pin 51 encounters one point, illustratively point SWa, of the star wheel, and produces a relative counterclockwise movement of this star wheel by an angular distance of, for example, slightly greater than 20 degrees for a star wheel having ten points; and then the jewel pin 51 in its circular path leaves the path of the tip of the star wheel point SWa and the balance system continues in its clockwise stroke without further action upon the star wheel. While the star wheel was at rest (FIG. 6), the locating spring 92 had its bight 93 engaged in the gap between two teeth of the pinion 87, to assure the proper presentation of the illustrative point SWa for engagement by the jewel pin 51. When the star wheel SW is driven as stated, a tooth of the pinion 87 acts on the locating spring 92 to press it away from the pinion axis; and when the jewel pin 51 is about to leave the path of the tip of the star wheel point SWa, this locating spring 92 has not yet returned relatively inwardly into deepest position in the next tooth gap of the pinion 87, but is presenting an inclined surface against the pinion tooth which has just passed, and the locating spring 92 now acts upon the star wheel system concurrently with the action of the jewel pin 51 upon the star wheel point SWa, and the star wheel is thus accelerated in its motion, and draws away from the jewel pin 51 until the locating spring 92 has fully entered and engaged in this next tooth gap of pinion 87. Thus, the locating spring 92 now holds the star wheel in its rest position, but with the next succeeding point SWb occupying the position previously occupied by point SWa in FIG. 6; i.e. a star wheel movement of 36 degrees has occurred. This acceleration of the star wheel also serves to remove the train load from the jewel pin 51.

Simultaneously with the power take-off by the action of jewel pin 51 upon the respective star wheel point, the fin 50 is causing closure of electrical contact by the blade CB, and therewith impulsing is occurring: so that a part of the electromagnetically induced force or impulse upon the balance is being immediately employed for the train drive, and the balance is in effect a coupling member for transmission of the train-driving power from the motor stator to the star wheel without storage of this power in the balance. Further, the contact fin 50 acts through an arc of 12 to 15 degrees, in a permissible adjustment of the blade CB, and this is distributed about equally at each side of neutral axis so that little effect is produced for changing the balance system from its natural rate.

During the return or idle stroke of the balance system in the illustrative form, the jewel pin 51 passes the star wheel point SWa, which has just been pushed forward, but engages against the forward edge of the succeeding star wheel point now SWb, and causes a retrograde rocking movement of the star wheel SW by an angle of, say, 7 degrees, and then escapes therefrom. During this retrograde movement, the aforesaid illustrative backlash permits movement of the pinion 87 without producing a retrograde movement of the wheel 106 meshing therewith. This minor retrograde movement of the star wheel SW has caused the pinion 87 to lift the locator blade 92 slightly, but upon escape of the jewel pin 51, the locating spring 92 again restores the star wheel to the normal rest position of FIG. 6, but now with the point SWb in the position previously occupied by the point SWa in the prior cycle.

The step-by-step advancement of the star wheel, through total angles of 36 degrees for each intermittent movement of the illustrative ten-point star wheel SW, continues, and the pinion 87 transfers this movement into the train structure by producing movement of the wheel 106, and therewith movement of the seconds, minutes, and hours hands.

The battery B has its terminal 210 presented in electrical contact with the spring clip 72 on the conductor strip 71 which passes along a groove in the train base plate TP and has the clip end 70 adjacent a terminal 69 of the electrical coil C. The other terminal 65 of the electrical coil electrically contacts the extension 62 of the side contact 60 which is mounted in the block 54, 55. The yoke 66 fits closely around the coil C at parts adjacent the terminal 69 for secure electrical connection with the terminal 69; and arches over the coil and engages the rectifier SC at the outer conductive face thereof for pressing the inner conductive face against the extension 62 and holding the latter against the terminal 65 both mechanically and electrically. The clip end 70 resiliently engages the yoke 66 essentially in line with the terminal 69 for secure electrical connection of these several parts.

The other terminal 211 of the electrical battery B is in electrical contact with a clip 212 (FIGS. 8, 9 and 13) carried by and grounded to the train base plate TP, and thus in electrical conductive relation with all non-insulated parts of the structure, including the block 54, 55 and the contact blade CB.

When the contact blade CB is away from the stationary contact 60, essentially no current flows through the system from the battery.

When the contact fin 50 in its clockwise stroke (FIG. 6) engages the contact blade CB and moves it into engagement with the end of the stationary contact 60, a circuit is closed, which may be traced from the battery B by terminal 210, clip 72, conductor strip 71, clip 70, yoke 66, terminal 69, through the electrical coil C to the terminal 65, thence by extension 62 to the stationary contact 60, contact blade CB, block 54, 55, to the frame as a common ground, with return by the clip 212 to the terminal 211 of the battery B. This current flow is in the same direction as that which has been imposing a static potential on the rectifier SC, and hence this rectifier conducts no more current than before. This current energizes the coil C, and an impulse is delivered to the rim BW of the balance system.

Shortly after this making of the circuit, e.g. a few milli-seconds, the contact fin 50 in its clockwise movement (FIG. 6) frees the contact blade CB, so that the circuit is again interrupted between the blade CB and the stationary contact 60. At this time, the coil C has maximum magnetic effect, and its induction tends to cause the current to continue to flow in the same direction as the stated impulsing current, that is, from the terminal 69 to the terminal 65. This would normally cause a sparking between the contact blade CB and the stationary contact 60 at the moment of breaking: but in the described system, the current derived from the collapsing magnetic field can flow through the strip 66 and the rectifier SC, so that the coil is essentially short circuited and rapidly loses its induced voltage: it being noted that the counter-electromotive force across the rectifier SC which is present while current is flowing from the battery, is no longer present to inhibit this discharging flow from the coil C in the "passing" direction for the rectifier SC.

Each time the electrical circuit is made by engagement of contact blade CB with the stationary contact 60, current energizes the electrical coil C and thus magnetizes the base plate PP and the pole piece 28 located in the plane of and closely adjacent the magnetizable balance wheel rim BW. The parts have been shown in FIG. 6 with the balance system near the neutral axis, so that the fin 50 has just moved the contact blade CB to engagement with the stationary contact 60 and the current is beginning to flow, it being noted that the balance assembly is now turning in its clockwise stroke as indicated by the arrows in FIGS. 5 and 6. This magnetization of the pole piece induces opposite magnetization in the balance rim BW, so that the stationary pole face 28 attracts the part of the rim between notches 40 and 45, with a magnetic air gap existing between the parts closely adjacent the edges 29 and 40a; these forces acting to add to the kinetic energy of the balance system whereby to maintain it in motion against frictional losses and the like, and also providing at this instant the energy for beginning the movement of the star wheel SW. This occurs at the neutral axis, when the balance is moving at maximum velocity; and the impulse effect is essentially symmetrical relative to the neutral axis, so that rate disturbance is minimized. Shortly thereafter, at a time determined by the adjustment of the block 54, 55 and the overlap of the contact blade CB with the fin 50, the contact blade CB is released and leaves the stationary contact 60. The field in the electrical coil C collapses by discharge of induced current through the rectifier SC, so that by the time that the part of the rim BW has come opposite the pole face 28, the magnetic energization has been dissipated, and there is thereafter essentially no magnetic drag upon the free further oscillatory movement of the balance system.

In the form illustrated in FIGS. 5 and 6 the electrical circuit is only closed during one stroke of each cycle, being the clockwise stroke: because the fin 50 moves the contact blade CB away from the stationary contact 60 during the return or counterclockwise stroke.

As shown in FIGS. 8 to 13, the train sub-assembly or unit includes the train base plate TP of FIGS. 1–4, upon which are mounted two bridges 100, 101, respectively secured by screws 103, with use of steady pins 104. Bearings in the train base plate TP and the bridge 100 support a pinion 107 with pivots 105, on which pinion is fixed a wheel 106, illustratively of sixty teeth, in mesh with the star wheel pinion 87. The pinion 107 has twenty teeth and is in mesh with a wheel 109 of fifty teeth and carried by the center-seconds pinion 111 having eight teeth and formed with pivots 110. The pinion 111 in turn is in mesh with the wheel 112, of sixty-four teeth, mounted on the pinion 114 having eight teeth and formed with pivots 113. Pinion 114 is in mesh with the wheel 115 of sixty teeth mounted on the hollow minutes staff 116, which (FIG. 10) carries the cannon pinion 117 having fifteen teeth in mesh with the wheel 119 of forty-five teeth, on the minute pinion 120 carried by a pin 121 (FIG. 10) projecting from the train base plate TP. This minute pinion 120 has twelve teeth and is in mesh with the hour wheel 123 of forty teeth and having the hub 125 carrying the hours hand H.

The sweep-seconds or center-seconds pinion 111 is carried by a bearing in the bridge 100, and is guided in the hollow minutes staff 116 in usual fashion. The hollow minutes staff 116 is carried by bearings in the train base plate TP and in the bridge 101. The hours hub 125 surrounds the cannon pinion 117 and is supported against excessive endwise movement by the rear face of the dial D and by the face of the pinion 117. The pinion 114 is carried by its pivots 113 in bearings in the train base plate TP and the bridge 100.

In the illustrative 300-beat balance system, the ten-point star wheel SW turns fifteen times per minute, and its pinion 87 advances by 150 teeth per minute, and drives the wheel 106 with a speed reduction of 6:1, so that the wheel 106 and the pinion 107 turn two and a half revolutions per minute, and the pinion 107 with a 5:2 speed reduction drives the wheel 109 and the seconds pinion 111 at one revolution per minute and thus operates the sweep or center-seconds hand S; the pinions and wheels 111, 112, 114, 115 accomplish a total speed reduction of 60:1, so that the minutes staff 116 turns at one revolution per hour. The cannon and transfer systems including pinions and wheels 117, 119, 120, 123 accomplish a 12:1 speed reduction, so that the hours hub 125 turns once in twelve hours.

A back-lash control is shown in FIG. 10, for preventing erratic, particularly retrograde, movements of the sweep seconds pinion 111 and its seconds hand S. A spring braking element 175 is held to the train bridge 100 by a screw 174, and has its curved end 176 bearing with a light detaining friction against the sweep seconds wheel 109.

An alternative back-lash control is shown in FIG. 11, in which the spring braking element 175a is held to the train bridge 100 by screw 174, and bears against a smooth part of the pinion 114.

Such a back-lash control prevents erratic movements of parts which might obscure accurate indication of time, or might be distracting by forward-and-back pulsations of a hand. It is of particular advantage with the permissive back-lash described between the pinion 87 and wheel 106 with employment of the star wheel as a take-off element.

Setting and Balance-Stopping Arrangement

The setting stem SS (FIGS. 10 and 12) extends through an aperture in the train base plate TP and has a squared portion 130 and a round pivot end 131 supported also in the train base plate. The squared portion 130 receives a slidable grooved clutch sleeve 132 having a conforming bore hole so that it is rotated when the stem SS is rotated, but the sleeve may be shifted axially along the squared portion 130 of this stem. The setting stem SS has a peripheral groove 134 into which engages (FIGS. 10 and 12) the pin 135 of a rocker 136 which is held to the train base plate TP by a screw 137; the pin 135 moves in a hole 138 of limited size, provided in the train base plate TP, and thus limits the endwise movements of the setting stem SS.

A sleeve 139 (FIG. 13) is forced-fitted in the train base plate TP and supports the rockable crank lever 140 which is held against axial movement by the screw 141 threaded into the sleeve 139. The crank lever 140 has an arm with rounded sides which fit against the walls of the peripheral groove in the clutch sleeve 132, this arm having at one edge near its end a nose 142. A second arm 143 of the rock lever bears against one end of a spring 144 which is held to the train base plate by a stud 145, whereby a constant effort is being exerted, tending to rock the lever 140, 143 in a counter-clockwise direction in FIG. 9.

The rocker 136 (FIGS. 9, 10 and 12) has a nose 148 cooperative with the nose 142 on the lever 140. When the setting stem SS is pulled out, that is, moved toward the right in FIGS. 8–10, its peripheral groove 134 carries the pin 135 with it and thus moves the rocker 136, so that the nose 148 thereof moves along the nose 142 and causes the lever 140 to rock in a clockwise direction (FIG. 9) against the action of spring 144 and therewith to move the clutch sleeve 132 toward the left in FIG. 9, that is, the sleeve 132 moves oppositely to the movement of the setting stem SS. This movement of lever 140 and the sleeve 132 continues until the tips of noses 148, 142 are opposite one another, after which a further movement of the setting stem SS permits the lever 140 to be rocked slightly counterclockwise by its spring 144, after the noses 148, 142 have passed one another: this brings the parts to a "setting" position in which they are held during the setting of the hands. Upon pushing the setting stem SS inward again, the pin 135 moves the rocker 136 in the opposite direction, and the nose 148 again slightly moves the lever 140 in a clockwise direction, until the noses 148, 142 pass one another, whereupon the spring 144 can take charge, and cause the lever 140 to turn to the position shown in FIG. 9, carrying the sleeve 132 with it.

The sleeve 132 is formed with crown teeth 150 which can mesh with the idler gear 151 carried by a pin 152 (FIG. 10) on the train base plate TP, and being itself in mesh with the cannon pinion 117. Thus, when the lever 140 has been rocked in a clockwise direction (FIG. 9), this meshing engagement occurs, and a rotation of the setting stem SS turns the sleeve 132 and its crown teeth 150, thus turning the idler gear 151 and causing the cannon sleeve to rotate for moving the minutes hand in the usual fashion, with transfer through the pinions and wheels 117, 119, 120, 123 in the usual way, with movement of the hours hand.

A pin 160 on the train base plate TP pivotally supports a balance-stopping lever 161 (FIGS. 8 and 13), having its end engaged in the groove of the sleeve 132, and being rocked thereby. The lever 161 supports a first spring finger 162 which extends toward the balance wheel rim BW, and cooperates with the pin 98 located on this balance wheel; the finger 162 is out of the path of the pin 98 when the setting mechanism is disengaged with the setting stem SS pushed in; but when the setting stem SS is drawn out, the parts cause a clockwise rocking of the lever 161 in FIG. 8, so that the spring finger 162 moves into the path of the pin 98 and detains this pin and therewith stops the balance wheel from further oscillation.

This balance-stopping finger 162 is thus effective, when the setting stem SS is in outward or setting position, to detain the balance system at a position about 90 degrees from the neutral axis, so that the fin 50 cannot engage the contact blade CB and close the circuit. This provides a simple way to prevent the battery being drawn upon prior to the delivery of the watch to the customer as the watch can be shipped in "setting" condition; the retailer at the time of delivery performs the normal operation of setting to time, and depresses the crown CR, whereupon the balance system begins to oscillate immediately, due to the partially-stressed condition of its hairspring, and the electrical system begins impulsing the balance. This finger 162 also serves during subsequent setting operations to prevent the balance from moving during times when the forces of setting are holding the train, and this avoids contact of the jewel pin 51 with the star wheel SW at times when this star wheel cannot move.

A second spring finger 164 mounted on the balance-stopping lever 161 has a bent end positioned in the plane of the wheel 112, so that when the lever 161 is rocked clockwise (FIG. 8) the finger 164 engages between two teeth of the wheel 112 and stops the train from turning; thus locking the train so that the setting is accomplished by slipping between the cannon sleeve 117 and the hollow minutes staff 116 in the manner customary for escapement-type watches; and avoiding any rotation of the other train parts and star wheel SW during setting.

Upon depression of the crown CR, the inward movement of the setting stem SS causes both fingers 162, 164 to disengage and liberate the parts they have been detaining.

*Connection of Motor and Train Sub-Assemblies*

As shown in FIGS. 1, 4 and 5 power unit base plate PP has two extensions 180, 181 which overlap corresponding parts of the train unit base plate TP. Screws 184, 185 pass through the parts for connecting them fixedly together, so that the two sub-assemblies can be united to a single unit, and this unit connected to the dial D before insertion in the watch case. This mechanical and electrical connection holds the plates fixedly together and at the same electrical potential, that is, that of battery terminal 211.

The dial D is illustrated (FIG. 10) as having the foot pins 186 which enter corresponding holes in the train base plate TP, and are secured by screws 187, so that the assembly of dial, motor structure, and train sub-assembly, with the hands in position, can be introduced into the watch case.

An electrical battery suitable for employment in an electrical watch is shown in FIGS. 1-3. This battery fits within the case, and rests at its upper face (FIG. 2) against the rear surface of the dial D, having the beveled upper surfaces 250, 251 for conformation, with a flat surface 252 forming therewith one side of the battery. The peripheral surfaces 253, 254 are spaced from the inner wall of the case (FIG. 1) for reception of the mounting ring MR; and the top beveled walls 250, 251 have projections KSb and KSc which are engaged by this mounting ring, wherewith the battery is supported against movement between the case front ring KF and the case back KB. As the illustrated case back KB is beveled at its outer periphery (FIG. 3), it is preferred to provide corresponding beveled surfaces on the battery at the side remote from the dial conforming with the shape of the case back, and surrounding a central flat wall. Thus, the battery has a casing provided by thin walls of the aforesaid shape and preferably formed integrally of a plastic material resistant to the electrolyte.

In the further form of construction shown in FIGS. 14 and 15, the power unit and the train structures are mounted on a single pillar or base plate, and the power unit is given two electrical impulses per cycle of oscillation, these impulses being delivered to an electrical coil which is mounted with its core parallel to the balance staff.

The pillar or base plate PP*m* is shaped and recessed as before to provide supports for the various staffs and other parts. The base plate PP*m* has case shoulder projections KS*m* which are engaged by the mounting structures and thereby the parts are maintained in a position wherein the dial rests as before against the inner surface of the front ring. The base plate extends past the center of the dial, to provide support for the staffs connected to the hands S, M, H; but terminates along a chordal line spaced from the end closing wall of the watch case, so that the battery B can be fitted in this space and thereby have a thickness from front to back closely approximating the distance from the dial to the internal surface of the case back KB.

The base plate PP*m* has bearings therein and supports bridges 74*m*, 100*m*, 101*m*, and a cock BC*m* containing other bearings whereby to support star wheel pivots 86, pivots 105 for the pinion 107, pivots 113 for the pinion 114, and the center assembly 110. The balance cock BC*m* supports a bearing for the balance staff BS, BS*m*. The train bridge 74*m* carries a bearing for the pinion 107 which supports the wheel 106. The train bridge 101*m* has a portion interposed between the center train bridge and the pillar plate PP*m*. A bridge PC*m* is interposed between the balance cock BC*m* and the base plate and carries a bearing for supporting the star wheel pinion 87. The several bridges are held by screws 103 and located by steady pins 104.

The balance staff BS*m* (FIG. 15) carries the balance wheel BW*m*, with its arm 37*m*, a collet supporting the inner end of the hairspring, and a roller collet with a jewel pin projecting axially therefrom as before, also has the contact fin of conductive material.

A block 54*m* of insulating material (FIG. 14) provides a base for contact structures, and is secured on the base plate PP*m* by screws 56*m*. A rear portion of this insulating base has therein a groove for receiving a support block 55*m* which fits the groove. The support block 55*m* has a notch 58*m* which receives the projecting flange of a screw 57 which is threadedly engaged in the block 54*m*, for adjusting movement in the directions toward and from the axis of the balance staff BS, BS*m*. A spring contact blade CB, illustratively a straight flat piece of resilient conductive metal, is fixed in the support block 55*m* at the end of the contact blade remote from the balance staff, and with the free end of the contact blade projecting free of the block 55*m* and into the path of oscillatory movement of the contact fin as before. The insulating block 54*m* also has a groove transverse to the direction of the contact blade CB, in which groove are received the ends of two relatively fixed contact members 60*ma*, 60*mb*, and the down-turned end of an electrical conductor strip 62*m* which lies on the upper surface of the rear portion of the insulating base. One edge of the insulating base block 54*m* is curved, to conform to the coil or electrical winding C*m*. The end of the conductive strip 62*m*, adjacent to the coil C*m*, is bent angularly and provides a spring contact clip 64m for engagement by the terminal 65m on the coil Cm.

One relatively fixed contact member is formed integral with a conductive spring portion 60mb extending in general parallelism with the contact blade CB and having its free end turned towards this contact blade to provide a mechanical stop for the movement of the contact blade and also providing electrical contact connection with this blade during engagement. Correspondingly the contact member portion of the other relatively fixed contact member 60ma is integral with the conductive spring portion which also is in general parallelism with the contact blade CB, but on the opposite side thereof from the blade portion of blade member 60mb; the blade portion of this member 60ma has its free end bent toward the contact blade CB and likewise serves as a mechanical stop and for electrical contact connection. The blade portion of member 60ma has a yoke connected therewith, extending beneath both the contact blade CB and the spring portion 60mb, and thence extending upwardly in general parallelism to but spaced from the blade portion 60mb. It is preferred to form the spring contact structures from spring sheet metal, with the parts when at rest occupying the positions indicated by FIG. 14.

In assembling the parts, the spacings or distances of the mechanical and conductive contact members may be adjusted and set by the respective screws 61m, 61ma which pass through threaded holes in the insulating base 54m in directions essentially at right angles to the contact blade CB, and respectively engage the contact members 60mb, 60mg. The material forming the spring portions of the contact blades is much thicker in width and section than the material of the contact blade CB. When the contact blade CB is moved at its outer free end until it engages one of the contact points on members 60ma and 60mb, the blade CB yields, but the point remains essentially in its adjusted position.

When the contact fin moves in a clockwise direction (FIG. 14) with the balance staff BS, BSm, it first encounters the contact blade CB while the latter is in its neutral and unstressed condition, and then presses this contact blade CB until it engages a fixed contact, at which time the circuit is closed; and during this time interval, the contact blade CB has bent as an end-mounted spring member, from its point of engagement in the support block 55m. Thus, the contact blade is not engaged with the fixed contact until there has been a stressing of the same, and correspondingly there is no rebound when the engagement occurs. As the contact fin continues to move in its clockwise direction, it continues to force the end of the contact blade CB in front of it, thus increasing the stress in the blade and the pressure of its engagement with fixed contact; but during this time the contact blade is bending from the point of mechanical engagement with the fixed contact as a fulcrum, so that its free end is turning through an arc of lesser radius than the exposed length of the total spring CB, wherewith the contact fin will escape from the end of the contact blade CB more rapidly than if the spring were bent from its point of mounting.

When the contact fin has stressed the contact blade CB and then passes its end, the electrical circuit is immediately broken at these parts, and the contact blade CB is now free to swing back toward its original neutral position. The kinetic energy in the contact blade, as it approaches the neutral position, will cause it to overswing; even if it should engage the opposite contact at extremely close adjustment of parts, and a long contact arc at the fin no circuit closure occurs because the contact blade CB is insulated from the pillar plate and other parts, and there is no conduction from the contact fin. During the remainder of the clockwise movement of the contact fin with the balance staff, the contact blade CB comes essentially to rest, its motion being braked in part by the successive engagement with the fixed contacts until the major portion of its energy has been consumed, and thereafter by the absorption of the remaining energy by air frictional losses, etc. Thus, by the time that the balance has passed to the end of its clockwise stroke, and then approaches the neutral axis in its following counter-clockwise stroke, the contact blade CB has returned to its neutral position and unstressed condition ready for a new engagement, at its opposite face, by the contact fin. Thereupon, the contact blade CB is swung toward the other fixed contact while stresses are being built up in it, until the engagement occurs with a closure of the electric circuit as before; thereafter, the free end portion of the contact blade CB, between the fixed contact and the contact fin is further bent, this time about the other fixed contact as a fulcrum and with the aforesaid mechanical behavior, until the contact fin releases the contact blade CB, with an opening of the circuit as before.

The arcuate length of the engagement, measured from axis of the balance staff BS, from contact fin 50m to the contact blade CB is determined by the relative overlap of these two parts when they are essentially at the neutral axis: and this in turn can be adjusted by moving the support block 55m toward and from the axis of the balance system, by rotating the adjustment screw 57. When the parts are at proper position, the screw 55ma is tightened, so that its head binds the block 55m in position.

The star wheel pinion 87 has fixed thereon a star wheel SW, here illustrated with twelve points, and the pinion 87 likewise has twelve teeth. Proper selection of ratios are made for wheels and pinions 106—107—109 so that the center seconds pinion will turn at one revolution per minute. The points of the star wheel are successively contacted by the jewel pin which partakes in the oscillatory movement of the balance assembly, as before. A locating spring 92 can be employed, as in FIG. 11.

The pillar plate has a groove 71mg along the front or dial-adjacent face thereof leading from a notch 71mn in the chordal edge, to a hole 71mh located opposite the peripheral surface of the electrical coil C. During manufacture, the groove 71mg is provided with an insulating coating and with a conductor strip 71m. This conductor strip 71m has angularly directed spring ends 72m and 70m located respectively in the notch 71mn and projecting through the hole 71mh as clips for respective engagement with a battery terminal and with the contact terminal 69m on the coil C.

Opposite other terminal of electrical battery B, a contact spring 212m is secured directly to the base plate, so that the base plate is maintained at the same potential as this battery terminal; and therewith all parts in electrical contact with the base plate PPm are at this potential. Thus, the balance cock BCm and the hairspring stud are at this potential, and current can flow through the hairspring to the collet on the balance staff BC and thus to the contact fin.

As described above, current can flow from the contact fin through the contact blade CB to one or the other of the fixed contacts for a small duration of time while the balance system is passing close to the neutral axis. Current then respectively flows from one or the other fixed contact by the corresponding blades to the contact strip 62m and thus to the spring clip 64m by which current is transferred to the terminal 65m on the electrical coil Cm. The return from the coil Cm to the battery occurs by the strip 71m described above.

The balance wheel BWm is illustrated (FIG. 15) as having a thick rim structure with an inwardly projecting flange 37mf and the diametrical arm 37m. The rim of the balance wheel has two diametrically opposed recesses for receiving the masses MA, MB. As it is desirable that a balance wheel makes from about 1⅛ to about 1½ turns per stroke (that is, say from 400 to 550 degrees of oscillation), it is preferred to form one of the masses MA, MB for magnetic effect, and to have the other mass of non-magnetic material: thus, the mass MA should be of material which is essentially non-magnetizable, such as brass, and may be protected if desired by a thin coating of gold or other non-magnetizable and non-corrodible material. The mass MB is a permanent magnet presenting a north pole at one face of the wheel, and a south pole at the other face of the wheel, for cooperation with the legs 28m extending from the coil core. The rest of the balance wheel structure, including the rim, mean-time screws, should also be of non-magnetic material. It will particularly be noted that by having the masses MA and MB separate from the balance during original manufacture, and by pairing such masses against one another for equality, it is feasible to assemble such pairs diametrically opposite one another on a balance, essentially without changing any existing poise. The masses MA, MB may be held in place by a cement, preferably a thermoplastic resin.

The operation of this motor drive structure is as follows:

When the balance wheel BWm is in oscillation, with the permanent magnet MB approaching the air gap between the pole pieces presented by the adjacent faces of the magnetic legs 28ma, magnetic effects are being induced and this mass is thus attracted as an armature, toward a position between the legs 28ma. The force thus exerted appears as impulsing energy tending to accelerate the balance wheel BWm. As the balance comes to neutral axis, the assembled fin engages the contact blade CB and the electric circuit is closed wherewith the coil Cm is energized. This energization of the coil produces an opposite magnetic effect in the magnetic legs 28m to that which has been induced therein by the permanent magnet MB. This effect, at the standardized size of the coil and of the magnetic yoke parts and the voltage and energy received from the electrical battery B, being sufficient to override the effects of the permanent magnet, and essentially reduce the relative magnetic polarities of the legs, 28m to zero, so that there no longer is an attraction upon the mass MB. Thus, the system operates by attracting the permanent magnet MB toward neutral axis, by the action of the pole pieces; and then reduces the magnetic effect of these pole pieces to zero, so that thereafter the balance will continue in its oscillatory motion essentially without drag from the pole pieces. When the energization of the coil Cm is terminated by opening the electrical circuit, the decrement of magnetic effects in the yoke occurs at such a rate that the system does not become strongly attractive until the magnet MB has moved so far past neutral axis that there is essentially no checking of the continued movement of the balance. When the balance has come to a standstill by storage of energy in the hairspring HS, and then makes its return stroke, a similar succession of events occurs, with the magnet MB being at first attracted by the pole faces at the ends of legs 28m, followed by the closure of the electrical circuit by energization of the coil Cm so that the pole pieces become essentially of zero polarity and permit the balance to continue in its stroke.

For such a device, the coil Cm may have a winding of copper wire about 0.002 inch in diameter, with a direct current resistance of the order of 100 to 500 ohms.

The structure of the balance wheel BWm (FIG. 14) also permits the employment of three pairs of mean-time screws 47m, with the elements of each pair located diametrically opposite one another, and with each located in a recess of the balance rim, so that there is no projection of these mean-time screws, in their final adjusted position, beyond the periphery of the balance rim; while, on the other hand, the masses MB, MA project considerably beyond this rim, and always beyond the heads of the mean-time screws 47m.

The structures illustrated in FIGS. 14 and 15, also include a mechanism by which the hands may be set to the desired hour and minute, without thereby producing a faulty operation of or damage to the structure. The general operation is the same as in the preceding forms.

In FIGS. 14 and 15, the watch stem SS has the usual crown CR, and may be drawn outwardly, in the usual way, by pulling on the crown. As before, the movement of the stem SS moves the clutch sleeve 132 along a generally square portion 130 of the stem SS.

A pivot 160 (FIG. 15) on the base plate carries a balance-stopping lever 161m having its end engaged in the peripheral groove of the clutch sleeve 132, and having a kerf for tightly receiving and holding the stopping spring 162m, this spring being located at the level of the masses MA, MB on the balance wheel BWm.

The operation of setting, and the effect in stopping the balance system, are as before.

Structures, such as jewel bearings, commonly employed in high grade horological movements, have not been set out in detail, and it will be understood to the expert that such may be included in structures without departing from this invention. Reference to the aforesaid application, now United States Letters Patent 2,865,163, is made for disclosure of parts not set out in full herein.

The foregoing description, and the accompanying drawings show illustrative forms of construction according to this invention, but it will be understood that these forms are not restrictive, and that the invention may be practiced in many ways within the scope of the appended claims.

We claim:

1. An electrically actuated timepiece including a frame; a rate-determining oscillatory structure on the frame and a spring connected to the structure and frame for causing oscillation of said structure, power means including a circuit maker energized from said structure during a limited portion of the movement thereof for maintaining motion of said oscillatory structure, a time train actuated from said structure and including a setting mechanism, and devices actuated by the setting mechanism in its movement into setting position, said devices including parts engaging the time train for detaining the same against movement during setting, and engaging the rate-determining structure for detaining the same in a position outside said limited portion of the movement thereof whereby it is held ineffective to energize the circuit maker and in which the said spring is under stress for procuring movement of the said structure when the said devices are disengaged from the rate-determining structure.

2. An electrically actuated timepiece including a frame, a rate-determining oscillatory structure on the frame and a spring connected to the structure and frame for causing oscillation of said structure, power means including a circuit maker energized from said structure during a limited portion of the movement thereof for maintaining motion of said oscillatory structure, a time train controlled by said structure and including a setting mechanism, a projection on said oscillating structure and a device actuated by said setting mechanism effective when the said mechanism is in setting position for engaging said projection and detaining the oscillatory structure against oscillation and in a position in which it does not energize the circuit maker and effective for detaining said spring in stressed condition when the mechanism is in setting position whereby the oscillatory structure begins oscillation by reason of said stressed condition when said mechanism is returned to non-setting position and the structure proceeds toward said limited portion of its movement and effects energization of the circuit maker.

3. In a magnetically impulsed apparatus having a frame, an indicating dial and a cooperating pointer, an oscillatory balance assembly on the frame and including a magnetic part moving with the balance, a spring connected to the frame and the said assembly for causing oscillation of the assembly, the oscillatory movement being past a neutral axis, said assembly including a first projection partaking in the oscillatory movement, a cooperative magnetic part on the frame, an electrical contact mounted on the frame, said balance assembly also including a second projection partaking in the oscillatory movement and effective for engaging the electrical contact assembly at a part of the oscillatory movement near the neutral axis, and an element movable on the frame and in one position engageable with said first projection to detain the balance assembly against oscillation with the second projection spaced from said electrical contact along the path of oscillatory movement relative thereto, and in another position being free of said second projection for permitting the oscillatory movement, said element when in said one position being effective to detain the balance assembly with said spring in stressed condition whereby upon movement of said element to said free position thereof the assembly is caused by the spring to move toward said neutral axis and effect closure of the electrical contact assembly.

4. In a magnetically impulsed horological apparatus having a frame, an indicating dial and a cooperating pointer, an oscillatory balance assembly on the frame and including a magnetic part on the frame, first and second projections on the balance assembly and partaking in the oscillatory movement, and a spring attached to the frame and to the balance assembly for causing oscillation of the balance, an electrical winding for determining the magnetic effect in one said magnetic part; electrical means including a contact blade extending into the path of said first projection, and circuit means for supplying current to said winding under control of the contact blade whereby the circuit is closed only during the engagement of said first projection with the blade; a driving connection from the balance assembly to said pointer, means for setting the pointer independently of said driving connection and including a movable element which in one position of the setting means is presented in the path of movement of said second projection, said movable element in said one position cooperating with said second projection to detain the balance assembly against oscillation and with said first projection spaced from the contact blade and with said spring in stressed condition whereby upon movement of said movable element from said one position the spring causes the balance assembly to move until said first projection engages the contact blade and effects supply of current to said winding.

5. A horological apparatus including a magnetically impulsed balance assembly, electrical means effective to establish the magnetic impulsing and including a contact blade, a first projection moving with the balance assembly for engaging the contact blade near the neutral axis of oscillation and thereby causing current flow for said impulsing, means for counting the oscillations of the balance, a second projection moving with the balance assembly, and means for setting said counting means and including a movable element, said movable element in one position being in the path of said second projection and effective to prevent movement of the balance assembly and to hold the same with the first projection angularly spaced from the contact blade.

6. An electrically actuated time-piece including a case, a time-indicating means having an electrically driven motive element including an oscillatory member and a spring for oscillating the same, said oscillatory member having a first projection, a contact actuated by the first projection for effecting electric current supply to said motive element near the neutral axis of the oscillation cycle, a second projection on said oscillatory member, a battery, said means and battery being located in said case with the battery connected for driving said element, and a device having a first portion accessible outside said case and a second portion within the case and operable for engaging said second projection and thereby detaining the oscillatory member against movement to said neutral axis of the oscillatory cycle and thereby preventing flow of current from the battery.

References Cited in the file of this patent

UNITED STATES PATENTS

| 319,145 | St. John | June 2, 1885 |
| 1,054,622 | Schneider | Feb. 25, 1913 |
| 1,493,466 | Burnstine | May 13, 1924 |
| 2,058,712 | Muir et al. | Oct. 27, 1936 |
| 2,768,495 | Sullivan et al. | Oct. 30, 1956 |

FOREIGN PATENTS

| 158,581 | Switzerland | Feb. 1, 1933 |
| 833,874 | France | Aug. 1, 1938 |
| 249,166 | Switzerland | Mar. 16, 1948 |